(12) United States Patent
Sakaue et al.

(10) Patent No.: US 11,216,613 B2
(45) Date of Patent: Jan. 4, 2022

(54) DOCUMENT SUMMARIZATION DEVICE, METHOD, AND PROGRAM

(71) Applicant: NIPPON TELEGRAPH AND TELEPHONE CORPORATION, Tokyo (JP)

(72) Inventors: Shinsaku Sakaue, Tokyo (JP); Tsutomu Hirao, Tokyo (JP); Masaaki Nishino, Tokyo (JP); Masaaki Nagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/970,932

(22) PCT Filed: Feb. 12, 2019

(86) PCT No.: PCT/JP2019/004905
§ 371 (c)(1),
(2) Date: Aug. 18, 2020

(87) PCT Pub. No.: WO2019/163584
PCT Pub. Date: Aug. 29, 2019

(65) Prior Publication Data
US 2020/0394212 A1   Dec. 17, 2020

(30) Foreign Application Priority Data

Feb. 20, 2018   (JP) .............................. JP2018-028305

(51) Int. Cl.
*G06F 17/10*   (2006.01)
*G06F 40/20*   (2020.01)
(Continued)

(52) U.S. Cl.
CPC ............ *G06F 40/20* (2020.01); *G06F 16/322* (2019.01); *G06F 16/345* (2019.01); *G06K 9/00469* (2013.01)

(58) Field of Classification Search
CPC ...... G06F 40/20; G06F 16/322; G06F 16/345; G06K 9/00469
See application file for complete search history.

(56) References Cited

U.S. PATENT DOCUMENTS

2017/0147544 A1* 5/2017 Modani ............... G06F 16/4393

OTHER PUBLICATIONS

Morita, Hajime, et al., "Subtree Extractive Summarization via Submodular Maximization," Proceedings of the 51st Annual Meeting of the Association for Computational Linguistics, pp. 1023-1032, Sofia, Bulgaria, Aug. 4-9, 2013 (Year: 2013).*

(Continued)

*Primary Examiner* — Shahid K Khan

(57) ABSTRACT

The present invention relates to summarization of a document. The method includes receiving texts of the document and a submodular function for defining an amount of information of a subset of the document as a summary of the document, generating a dependency structure tree representing a dependency structure of sentences in a document, identifying a set of paths including the root of the dependency structure tree, recursively selecting a paths using a greedy algorithm for maximizing the submodular function, and outputs a subset with the maximum amount of information as a the summary of the document.

17 Claims, 5 Drawing Sheets

(51) Int. Cl.
G06F 16/31 (2019.01)
G06F 16/34 (2019.01)
G06K 9/00 (2006.01)

(56) References Cited

OTHER PUBLICATIONS

Lin, Hui, et al., "Multi-document Summarization via Budgeted Maximization of Submodular Functions," Human Language Technologies: The 2010 Annual Conference of the North American Chapter of the ACL, pp. 912-920, Los Angeles, California, Jun. 2010.
Berg-Kirkpatrick, Taylor, et al., "Jointly Learning to Extract and Compress," Proceedings of the 49th Annual Meeting of the Association for Computational Linguistics, pp. 481-490, Portland, Oregon, Jun. 19-24, 2011.
Morita, Hajime, et al., "Subtree Extractive Summarization via Submodular Maximization," Proceedings of the 51st Annual Meeting of the Association for Computational Linguistics, pp. 1023-1032, Sofia, Bulgaria, Aug. 4-9, 2013.
Morita et al. (2013) "Query-oriented summarization based on sentence extraction and sentence compression using a submodular maximization algorithm" Proceedings of the 19th Annual Meeting of the Natural Language Processing Society, Mar. 12, 2013, pp. 500-503.

\* cited by examiner

Algorithm 1 GREEDY ALGORITHM

1: $U \leftarrow \mathcal{P}, X \leftarrow \emptyset$
2: while $U \neq \emptyset$ do
3:     $p = \mathrm{argmax}_{p' \in U} \frac{f(\{p'\}|X)}{c(\{p'\}|X)}$
4:     if $c(X + \{p\}) \leq L$ then
5:         $X \leftarrow X + \{p\}$
6:     end if
7:     $U \leftarrow U - \{p\}$
8: end while
9: $\hat{p} = \mathrm{argmax}_{p' \in \mathcal{P}} f(\{p'\})$
10: return $Y = \mathrm{argmax}_{X' \in \{X, \{\hat{p}\}\}} f(X')$

DOCUMENT SUMMARIZATION DEVICE, METHOD, AND PROGRAM

CROSS-REFERENCE TO RELATED APPLICATIONS

This application is a U.S. 371 Application of International Patent Application No. PCT/JP2019/004905, filed on 12 Feb. 2019, which application claims priority to and the benefit of JP Application No. 2018-028305, filed on 20 Feb. 2018, the disclosures of which are hereby incorporated herein by reference in their entireties.

TECHNICAL FIELD

The present invention relates to a document summarizing device, method, and program, and in particular relates to a document summarizing device, method, and program that create a summary with a large amount of information.

BACKGROUND ART

Document summarization is an attempt to, when given large-scale document data, create a shorter text (summary) that encompasses as much important content in the document as possible.

One of the techniques frequently used in developing document summarizing devices is called sentence extraction summarization. In this technique, several important sentences are selected from a given document, thereby creating a summary. Summarizing devices based on this technique include that described in NPL 1, and so forth.

Meanwhile, regarding sentences that a document to be summarized contains, there often are cases where each individual sentence is long, and such sentences often contain redundant portions. Using sentence extraction summarization in such cases results in the upper limit of length constraint being reached by selecting only a few redundant and long sentences, and accordingly a summary with a large amount of information has not been able to be obtained. A valid technique to handle such a situation is sentence compression summarization. In sentence compression summarization, short sentences including only important portions are extracted by compressing the original sentence, and these short sentences are used to create a summary. Accordingly, summaries with a large amount of information can be created even in cases where the constraint on length of the summary is tight. Known technology of such sentence compression summarization includes those described in NPL 2 and NPL 3.

CITATION LIST

Non Patent Literature

[NPL 1] Hui Lin and Jeff Bilmes. 2010. Multi-document summarization via budgeted maximization of submodular functions. In Human Language Technologies: The 2010 Annual Conference of the North American Chapter of the Association for Computational Linguistics. pages 912-920.

[NPL 2] Taylor Berg-Kirkpatrick, Dan Gillick, and Dan Klein. 2011. Jointly learning to extract and compress. In Proceedings of the 49th Annual Meeting of the Association for Computational Linguistics: Human Language Technologies. Association for Computational Linguistics. pages 481-490.

[NPL 3] Hajime Morita, Ryohei Sasano, Hiroya Takamura, and Manabu Okumura. 2013. Subtree extractive summarization via submodular maximization. In Proceedings of the 51st Annual Meeting of the Association for Computational Linguistics (Volume 1: Long Papers). pages 1023-1032.

SUMMARY OF THE INVENTION

Technical Problem

The following two points are problematic in known sentence compression summarization methods.

Firstly, the types of applicable object functions are limited in the known techniques. Accordingly, there is a problem in that the approach of obtaining a better summary by appropriately designing object functions cannot be employed.

Secondly, the known techniques need processing that incurs large calculation costs (integer programming, dynamic programming, etc.) in order to obtain a summary. Accordingly, there is a problem that application to summary creation of large-scale document data is difficult.

The present invention has been made to solve the above problems, and accordingly it is an object thereof to provide a document summarizing device, method, and program, that can summarize documents at high speed, using submodular maximization.

Means for Solving the Problem

In order to achieve the above object, a document summarizing device according to a first invention is configured including a search unit which, with regard to submodular maximization where non-redundant subsets are searched in a set of which elements are words of a document so as to summarize the document, accepts a set including each element of the submodular maximization, a submodular function defining an amount of information with regard to a subset of the set, a dependency structure tree representing a dependency structure of the document, a set of paths containing the root of the dependency structure tree, a length of each of the elements, and an upper limit of length of the subset, and repeats selecting the paths using a greedy algorithm so as to maximize the submodular function and obtain a subset where the amount of information is largest from a subset that is included in a rooted subtree of the dependency structure tree and that also satisfies a constraint of the summation of lengths of elements of the subset being no larger than the upper limit, and outputs the subset as a summary of the document.

A document summarizing method according to a second invention is executed including a step of a search unit, with regard to submodular maximization where non-redundant subsets are searched in a set of which elements are words of a document so as to summarize the document, accepting a set including each element of the submodular maximization, a submodular function defining an amount of information with regard to a subset of the set, a dependency structure tree representing a dependency structure of the document, a set of paths containing the root of the dependency structure tree, a length of each of the elements, and an upper limit of length of the subset, and repeating selecting the paths using a greedy algorithm so as to maximize the submodular function and obtain a subset where the amount of information is largest from a subset that is included in a rooted subtree of the dependency structure tree and that also satisfies a constraint of the summation of lengths of elements of the subset being no larger than the upper limit, and outputting the subset as a summary of the document.

A program according to a third invention is a program that causes a computer to function as each part of the document summarizing device according to the first invention.

Effects of the Invention

According to a document summarizing device, method, and program according to the invention, a set including each element of the submodular maximization, a submodular function defining an amount of information with regard to a subset of the set, a dependency structure tree representing a dependency structure of the document, a set of paths containing the root of the dependency structure tree, a length of each of the elements, and an upper limit of length of the subset, are accepted, selecting the paths using a greedy algorithm so as to maximize the submodular function is repeated, so as to obtain a subset where the amount of information is largest from a subset that is included in a rooted subtree of the dependency structure tree and that also satisfies a constraint of the summation of lengths of elements of the subset being no larger than the upper limit, and the subset is output as a summary of the document. Accordingly, an advantage can be obtained in that a document can be summarized at high speed using submodular maximization.

BRIEF DESCRIPTION OF DRAWINGS

FIG. 3 is a diagram illustrating an example of a greedy algorithm.

DESCRIPTION OF EMBODIMENTS

An embodiment of the present invention will be described in detail below with reference to the Figures.

Principle According to Embodiment of Present Invention

First, a principle of the embodiment according to the present invention will be described. A summary is created so that the length of the summary (total count of words or count of characters) obtained in the end is no more than an upper limit value decided beforehand in the embodiment according to the present invention.

When compressing a sentence, simply extracting and connecting words and phrases that have large amounts of information does not preserve structures such as modifier-modificand (dependency structure) in the original sentence, and accordingly a summary with low readability is output as a result. As means to avoid such a problem, a policy is frequently employed where a tree structure called a dependency structure tree is configured for each sentence, and part of the tree is extracted, thereby creating a compressed sentence (see NPL 4, for example). Sentence compression summarization is performed following such a policy in the embodiment according to the present invention, as well.

[NPL 4] Katja Filippova and Michael Strube. 2008. Dependency tree based sentence compression. In Proceedings of the 5th International Natural Language Generation Conference. pages 25-32.

An optional positive integer k is set so that $[k]=\{1, 2, \ldots, k\}$. Summarizing a document made up of N sentences by sentence compression summarization will be considered here. The dependency structure tree corresponding to an i'th sentence ($i \in [N]$) will be referred to as the i'th sentence tree, and will be written as $T_i = (V_i, E_i)$. $V_i$ is a set of words (or chunks) included in the i'th sentence, and these make up a vertex set of $T_i$. $E_i$ represents the dependency relation among pairs of elements within $V_i$, making up an edge set of $T_i$. Such a dependency structure tree for each sentence can be obtained by a method described in NPL 4. Further, a tree structure referred to as a document tree is defined as a tree structure that is a union of $T_1, \ldots, T_N$, which is written as $$T = (V \cup \{r\}, E)$$

where
r
is the root of the document tree that has been introduced for the sake of convenience in making a single union of each of the sentence trees, and V and E are the vertex set and edge set of the document tree, defined as in Formula (1).

[Formula 1]

$$V := \bigcup_{i \in [N]} V_i, \quad E := \bigcup_{i \in [N]} \{E_i \cup \{(r, r_i)\}\}. \qquad (1)$$

Figure 1:
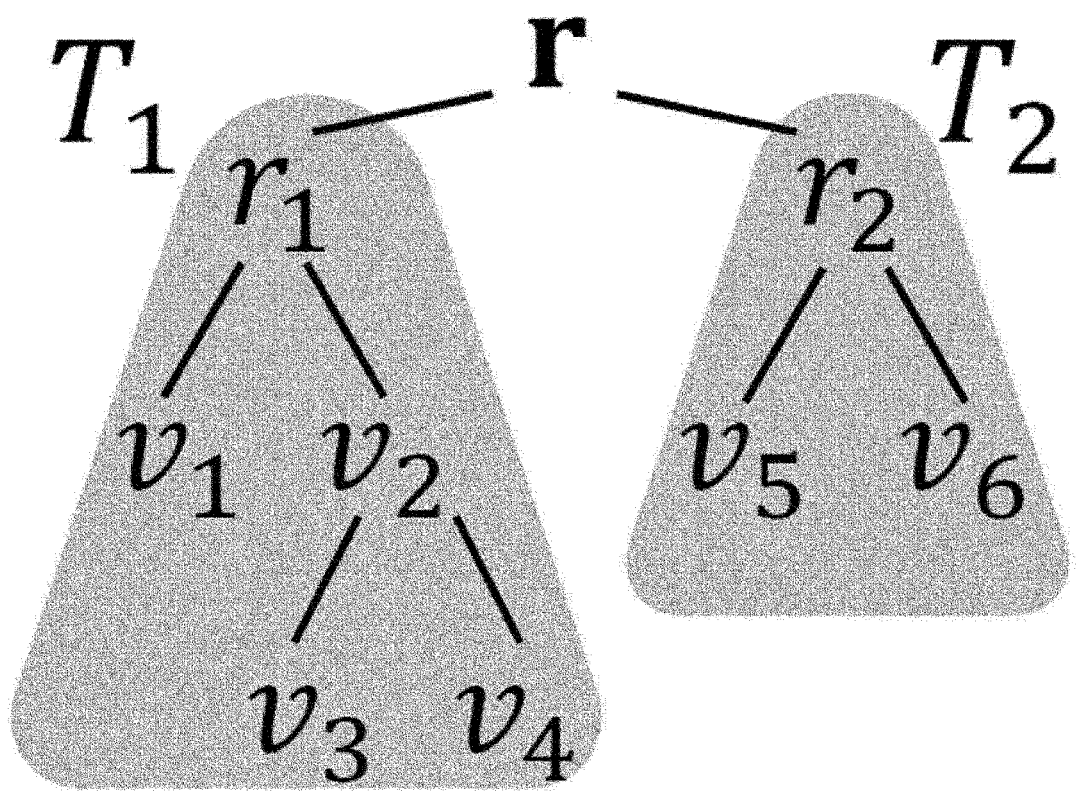
FIG. 1 is a diagram illustrating an example of a document tree made up of two sentence trees $T_1$ and $T_2$, which are dependency structure trees.

An example of above-described sentence trees and document tree is illustrated in FIG. 1. FIG. 1 represents a document tree
T
made up of two sentence trees, $T_1$ and $T_2$. When
T
is given, if a subset $S \subseteq V$ of words (or chunks) included in a summary and
r
make up a subtree where
r
is the root in
T
then the summary S has preserved the dependency structure. Also, a length $l_v \geq 0$ is allocated to each element v of V. $l_v$ is equivalent to a count of characters in a word, for example. The total of lengths of v contained in the summary S must be no larger than a certain upper limit value L. That is to say, $$\Sigma_{v \in S} l_v \leq L$$

must be satisfied. Accordingly, the object in sentence compression summarization is to extract a summary $S \subseteq V$ with a larger amount of information, under constraints of making of subtree having
r
as a root on
T
and also the length being no larger than L.

How large the amount of information of the summary $S \subseteq V$ is will be evaluated using some sort of function $$g : 2^V \to \mathbb{R}.$$

Finding an S where the value g(S) of this function is large enables a summary with a larger amount of information to be obtained. This function g will be referred to as an object function. In the embodiment according to the present invention, a monotone submodular function is used as the object function g. Note however, that g being a monotone submodular means that the following relation holds regarding an optional X⊆Y.

$$g(X) \le g(Y),$$

$$g(X)+g(Y) \ge g(X \cup Y)+g(X \cap Y)$$

Many object functions used for summary evaluation satisfy the above monotone submodular function nature, so the technique of the embodiment according to the present invention can be applied to various object functions used for summarizing.

In light of the above, it can be understood that a summary can be obtained by sentence compression summarization by solving the problem of the following Formula (2).

[Formula 2]

$$\underset{S \subseteq V}{\text{maximize}} \quad g(S) \qquad (2)$$

$$\text{subject to} \quad \sum_{v \in S} l_v \le L,$$

S∪{r} makes up a subtree where r is a root on T

In the technique that is proposed in the embodiment according to the present invention, measures are employed where this problem is reformulated into a separate problem as in Formula (3) which will be described later, and a high-speed algorithm that operates thereupon is used, thereby obtaining a summary. For the algorithm, a greedy algorithm illustrated in FIG. 3 (Algorithm 1) is used.

A path that connects v and
r
is conceived for each element v∈V corresponding to each vertex of the document tree, and a set of these paths is written as

.

Figure 2:
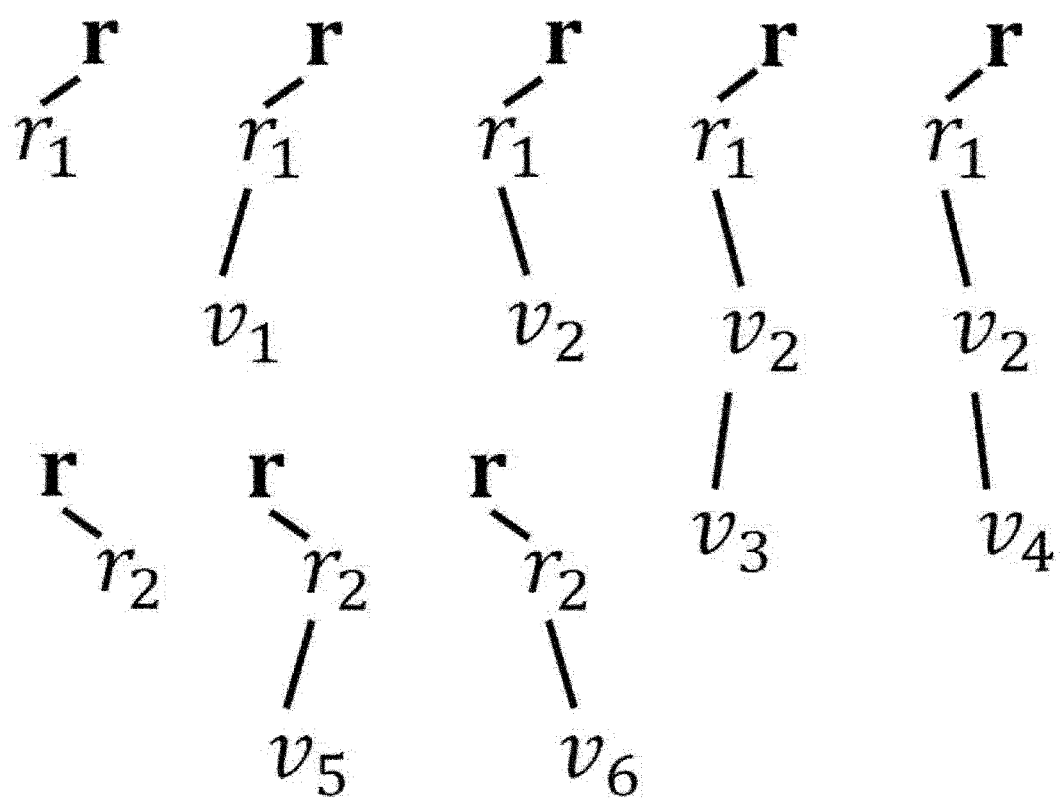
FIG. 2 is a diagram illustrating an example of a set of paths corresponding to the document tree.

That is to say, there is only one corresponding path $p \in$ 

for each element v∈V, and accordingly $|V|=|$  $|$ holds. FIG. 2 represents a set

of paths made of the document tree
T
in FIG. 1. As illustrated in FIG. 2, a set of paths is represented by each of paths corresponding to a node r connected to each element v and the root. Also, $V_p \subseteq V$ is a set of vertices included in p, and $$V_X := \cup_{p \in X} V_p$$

is defined as to an optional $X, Y \subseteq$ .

By using the above, the above problem (2) can be rewritten as the following Formula (3).

[Formula 3]

$$\underset{X \subseteq \mathcal{P}}{\text{maximize}} \quad f(X) := g(V_X) \qquad (3)$$

$$\text{subject to} \quad c(X) := \sum_{v \in V_X} l_v \le L.$$

Now, binary operations + and − on
𝒫
are defined as follows.

$X+Y:=\{p \in \mathcal{P} : p \in X \text{ and/or } p \in Y\},$ $X-Y:=\{p \in \mathcal{P} : p \in X \text{ and } p \notin Y\}.$ These respectively represent taking a sum set and difference set on
𝒫.

Further, definition is made regarding an optional $X,Y \subseteq \mathcal{P}$ as follows.

[Formula 4]

$$f(X|Y):=f(X+Y)-f(Y), c(X|Y):=c(X+Y)-c(Y) \qquad (4)$$

f(X|Y) represents increase in a subset in the submodular function, and c(X|Y) represents increase in the summation of lengths of elements of the subset. In the proposed technique, applying the greedy algorithm shown as Algorithm 1 in FIG. 3 to the problem in Formula (3) above yields the solution $X, Y \subseteq$ .

Summary $V_Y \subseteq V$ is obtained from this solution, and $V_Y$ satisfies the above-described summary length constraint, and accordingly the constraint of being a rooted subtree of T.

Also, defining $\lambda := \max_{i \in [N]} \lambda_i$ where i is the count of vertices that are leaves of each sentence tree gives $V_Y$ as an approximation solution $½(1-e^{-1/\lambda})$ to the problem of Formula (2). That is to say, it can be theoretically guaranteed that a solution obtained by the above-described greedy algorithm will always be a good summary to a certain degree.

Figure 4:
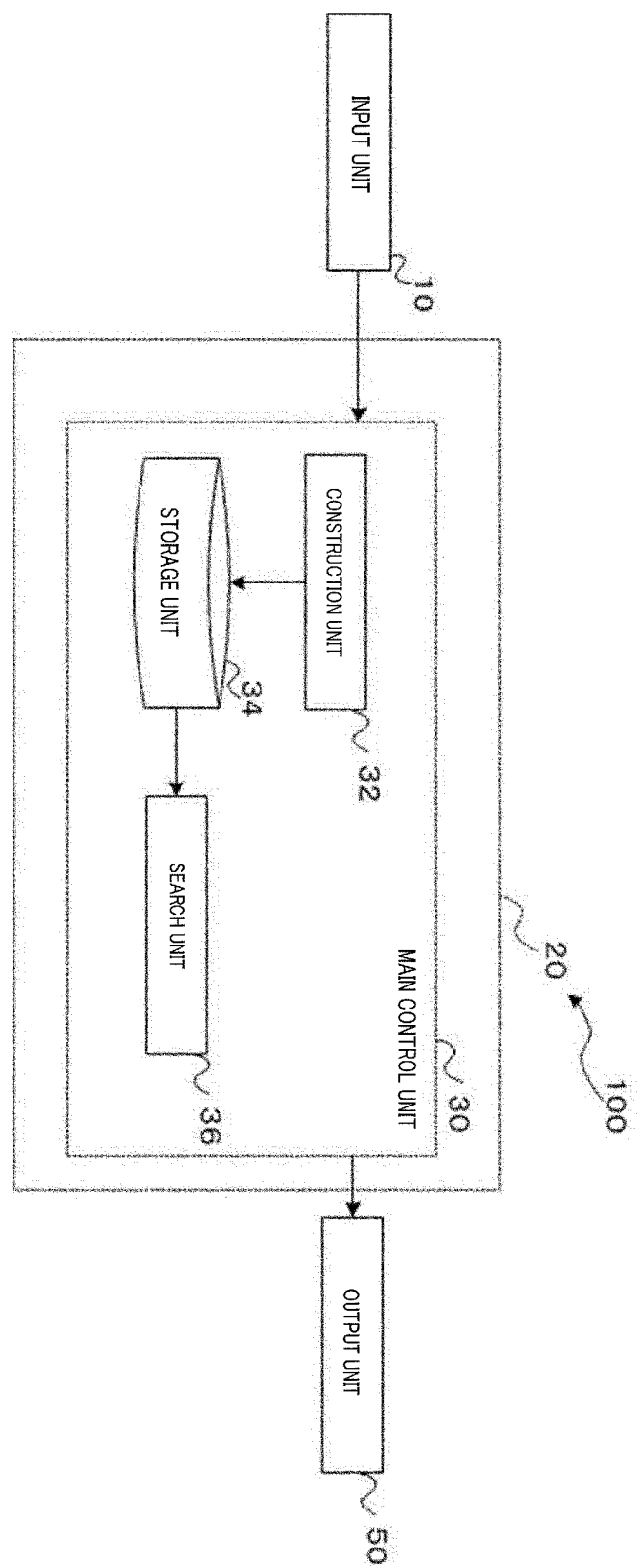
FIG. 4 is a block diagram illustrating a configuration of a document summarizing device according to an embodiment of the present invention.

Configuration of Document Summarizing Device According to Embodiment of Present Invention Next, a configuration of a document summarizing device according to the embodiment of the present invention will be described. As illustrated in FIG. 4, the document summarizing device 100 according to the embodiment of the present invention can be configured by a computer including a CPU, RAM, and ROM storing a program and various types of data for executing a later-described document summarizing processing routine. This document summarizing device 100 is functionally provided with an input unit 10, a computing unit 20, and an output unit 50, as illustrated in FIG. 4.

The input unit 10 accepts document data, a submodular function g that defines the amount of information regarding a summary of the document data, and a summary length upper limit L. The document data is a set including individual elements of submodular maximization, where words are elements. The summary is a subset where the amount of information is largest in a submodular function. The summary length upper limit L is the upper limit of the length of the subset where the amount of information is largest in the submodular function.

The computing unit 20 is configured including a main control unit 30.

The main control unit 30 is configured including a construction unit 32, a storage unit 34, and a search unit 36.

The construction unit 32 creates a document tree $$T=(V \cup \{r\}, E)$$

which is a dependency structure tree, using the method in NPL 4, from the document data accepted by the input unit 10, calculates a length $l_v$ of each element $v \in V$ of the set included in the dependency structure tree, and stores the results of calculation in the storage unit 34.

The search unit 36 accepts the document data, the submodular function g, the summary length upper limit L, the set of paths

including the root
r
in the dependency structure tree
T
stored in the storage unit 34, and the length $l_v$ of each element. Further, the search unit 36 repeats selecting paths using the greedy algorithm so as to maximize the submodular function in Formula (3) obtained by reformulating the submodular function shown in Formula (2), thereby obtaining a subset where the amount of information is largest from a subset that is included in a rooted subtree of the dependency structure tree and that also satisfies the constraint of the summation of lengths of elements $l_v$ of the subset being no larger than the upper limit L, which is output to the output unit 50 as the document summary $S \subseteq V$. Searching is performed by repeating path selection where the ratio of the increase $f(\{p'\}|X)$ of the submodular function due to path selection as to the increase $c(\{p'\}|X)$ of the summation of lengths of elements of the subset due to path selection is largest (line 3 in FIG. 3), using the greedy algorithm shown in Algorithm 1 in FIG. 3.

In this way, the technique according to the present embodiment operates with regard to an optional monotone submodular function g. Accordingly, an approach can be taken where g is appropriately designed in accordance with a summarization task that has been given, and a better summary is obtained. Also, the greedy algorithm according to Algorithm 1 used in the technique according to the present embodiment operates faster than the integer programming used in NPL 2 or the dynamic programming used in NPL 3, and accordingly a summary can be obtained faster than with existing methods.

Figure 5:
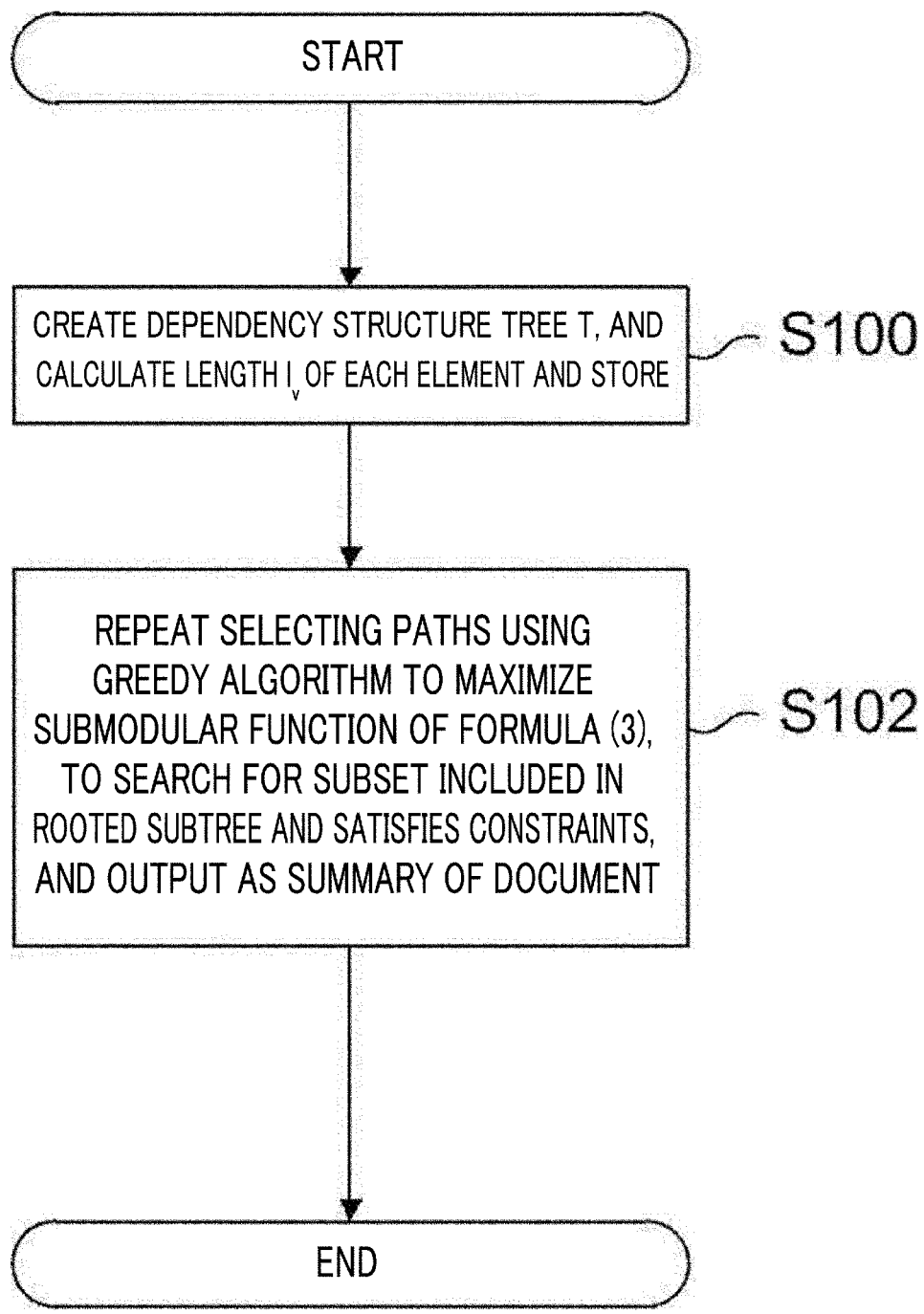
FIG. 5 is a flowchart illustrating a document summarization processing routine in the document summarizing device according to the embodiment of the present invention.

Operations of Document Summarizing Device According to Embodiment of Present Invention Next, the operations of the document summarizing device 100 according to the embodiment of present invention will be described. Upon accepting document data, the submodular function g, and the summary length upper limit L at the input unit 10, the document summarizing device 100 executes the document summarizing processing routine illustrated in FIG. 5.

First, in step S100, a document tree $$T=(V \cup \{r\}, E)$$

which is a dependency structure tree is created using the method in NPL 4, from the document data accepted by the input unit 10, and a length $l_v$ of each element $v \in V$ is calculated and stored in the storage unit 34.

Next, in step S102, the document data, the submodular function g, the summary length upper limit L, the set of paths

including the root
r
in the dependency structure tree
T
stored in the storage unit 34, and the length $l_v$ of each element, are accepted. Further, selecting paths using the greedy algorithm so as to maximize the submodular function in Formula (3) obtained by reformulating the submodular function shown in Formula (2) is repeated, thereby obtaining a subset where the amount of information is largest from a subset that is included in a rooted subtree of the dependency structure tree and that also satisfies the constraint of the summation of lengths of elements $l_v$ of the subset being no larger than the upper limit L, which is output to the output unit 50 as the document summary $S \subseteq V$.

As described above, the document summarizing device according to the embodiment of the present invention can summarize a document at high speed by performing the following processing using submodular maximization. That processing is to accept a set including each element of the submodular maximization, a submodular function defining an amount of information with regard to a subset of the set, a dependency structure tree representing a dependency structure of the document, a set of paths containing the root of the dependency structure tree, a length of each of the elements, and an upper limit of length of the subset, repeat selecting paths using a greedy algorithm so as to maximize the submodular function and obtain a subset where the amount of information is largest from a subset that is included in a rooted subtree of the dependency structure tree and that also satisfies a constraint of the summation of lengths of elements of the subset being no larger than the upper limit, and output the subset as a summary of the document.

The present invention is not restricted to the above-described embodiment, and various modifications and adaptations can be made without departing from the spirit of this invention.

For example, a case has been described in the above embodiment where a dependency structure tree is created by the construction unit 32 and lengths of the elements are calculated, but this is not restrictive. An arrangement may be made where no construction unit 32 is provided, and a dependency structure tree created beforehand, and lengths $l_v$ of the elements calculated beforehand, are accepted.

REFERENCE SIGNS LIST

10 Input unit
20 Computing unit
30 Main control unit
32 Construction unit
34 Storage unit
36 Search unit
50 Output unit
100 Document summarizing device

The invention claimed is:

1. A computer-implemented method for generating a summary text of a document, the method comprising:
receiving a document, the document including a set of words in texts;
receiving a submodular function, the submodular function defining an amount information of a subset of the document as the summary text of the document;
receiving a predefined upper limit of a length of the subset of the document;
extracting a set of sentence texts from the document;
generating a set of sentence trees based on sentence compression, each sentence tree representing at least one sentence text of the set of sentence texts, each sentence tree including a node representing at least a word;
aggregating the set of sentence trees with the root, the root forming a union of each of the sentence trees for generating the dependency tree of the document;
generating the dependency tree with the root, the dependency tree representing a dependency structure of the document based on a union of sentence trees using sentence texts of the document;
identifying a set of paths of the dependency tree, each path including the root of the dependency tree;
identifying a set of lengths, each length of the set of length representing a length of each path of the set of paths;
recursively selecting a path based on a greedy algorithm for maximizing the submodular function;
selecting a set of subsets of the document from the set of paths, wherein each subset of the set of subsets has a total length within the predefined upper limit of the length of the subset of the document;
selecting, from the set of subsets, a subset with the maximum amount of information based on the submodular function; and
providing the subset as the summary text of the document.

2. The computer-implemented method of claim 1, the method further comprising:
using the greedy algorithm, recursively selecting a path, wherein a ratio between an increase of a value of the submodular function based on the path selection and an increase of a sum of lengths of words of the subset based on the path selection is the largest.

3. The computer-implemented method of claim 1, wherein the summary text of the document has a length within the predefined upper limit and the largest amount information, and wherein the length being either a total number of words or characters.

4. The computer-implemented method of claim 1, wherein the submodular function is a monotone submodular function.

5. The computer-implemented method of claim 1, wherein the set of words of the document comprising parameters of a submodular maximization problem.

6. The computer-implemented method of claim 1, wherein each path of the set of paths representing a plurality of words of a text in the document as candidates of the summary text of the document.

7. A system for generating a summary text of a document, the system comprises:
a processor; and
a memory storing computer-executable instructions that when executed by the processor cause the system to:
receive a document, the document including a set of words in texts;
receive a submodular function, the submodular function defining an amount information of a subset of the document as the summary text of the document;
receive a predefined upper limit of a length of the subset of the document;
extract a set of sentence texts from the document;
generate a set of sentence trees based on sentence compression, each sentence tree representing at least one sentence text of the set of sentence texts, each sentence tree including a node representing at least a word;
aggregate the set of sentence trees with the root, the root forming a union of each of the sentence trees for generating the dependency tree of the document;
generate the dependency tree with the root, the dependency tree representing a dependency structure of the document based on a union of sentence trees using sentence texts of the document;
identify a set of paths of the dependency tree, each path including the root of the dependency tree;
identify a set of lengths, each length of the set of length representing a length of each path of the set of paths;
recursively select a path based on a greedy algorithm for maximizing the submodular function;
select a set of subsets of the document from the set of paths, wherein each subset of the set of subsets has a total length within the predefined upper limit of the length of the subset of the document;
select, from the set of subsets, a subset with the maximum amount of information based on the submodular function; and
provide the subset as the summary text of the document.

8. The system of claim 7, the computer-executable instructions when executed further causing the system to:
using the greedy algorithm, recursively select a path, wherein a ratio between an increase of a value of the submodular function based on the path selection and an increase of a sum of lengths of words of the subset based on the path selection is the largest.

9. The system of claim 7, wherein the summary text of the document has a length within the predefined upper limit and the largest amount information, and wherein the length being either a total number of words or characters.

10. The system of claim 7, wherein the submodular function is a monotone submodular function.

11. The system of claim 7, wherein the set of words of the document comprising parameters of a submodular maximization problem.

12. The system of claim 7, wherein each path of the set of paths representing a plurality of words of a text in the document as candidates of the summary text of the document.

13. A computer-readable non-transitory recording medium storing computer-executable instructions that when executed by a processor cause a computer system to:
receive a document, the document including a set of words in texts;
receive a submodular function, the submodular function defining an amount information of a subset of the document as the summary text of the document;
receive an upper limit of a length of the subset of the document;
extract a set of sentence texts from the document;
generate a set of sentence trees based on sentence compression, each sentence tree representing at least one sentence text of the set of sentence texts, each sentence tree including a node representing at least a word;
aggregate the set of sentence trees with the root, the root forming a union of each of the sentence trees for generating the dependency tree of the document;
generate the dependency tree with the root, the dependency tree representing a dependency structure of the document;
identify a set of paths of the dependency tree, the set of paths including the root of the dependency tree based on a union of sentence trees using sentence texts of the document;
identify a set of lengths, each length of the set of length representing a length of each path of the set of paths;
recursively select a path based on a greedy algorithm for maximizing the submodular function;
select a set of subsets of the document from the set of paths, wherein each subset of the set of subsets has a total length less than the upper limit of the length of the subset of the document;
select, from the set of subsets, a subset with the maximum amount of information based on the submodular function; and
provide the subset as the summary text of the document.

14. The computer-readable non-transitory recording medium of claim 13, the computer-executable instructions when executed further causing the system to:
using the greedy algorithm, recursively select a path, wherein a ratio between an increase of a value of the submodular function based on the path selection and an increase of a sum of lengths of words of the subset based on the path selection is the largest.

15. The computer-readable non-transitory recording medium of claim 13, wherein the summary text of the document has a length within the predefined upper limit and the largest amount information, and wherein the length being either a total number of words or characters.

16. The computer-readable non-transitory recording medium of claim 13, wherein the set of words of the document comprising parameters of a submodular maximization problem.

17. The computer-readable non-transitory recording medium of claim 13, wherein each path of the set of paths representing a plurality of words of a text in the document as candidates of the summary text of the document.

* * * * *